March 13, 1928.
O. A. ANDERSON
1,662,099
LOCKING DEVICE FOR MOTOR VEHICLES
Filed March 9, 1925
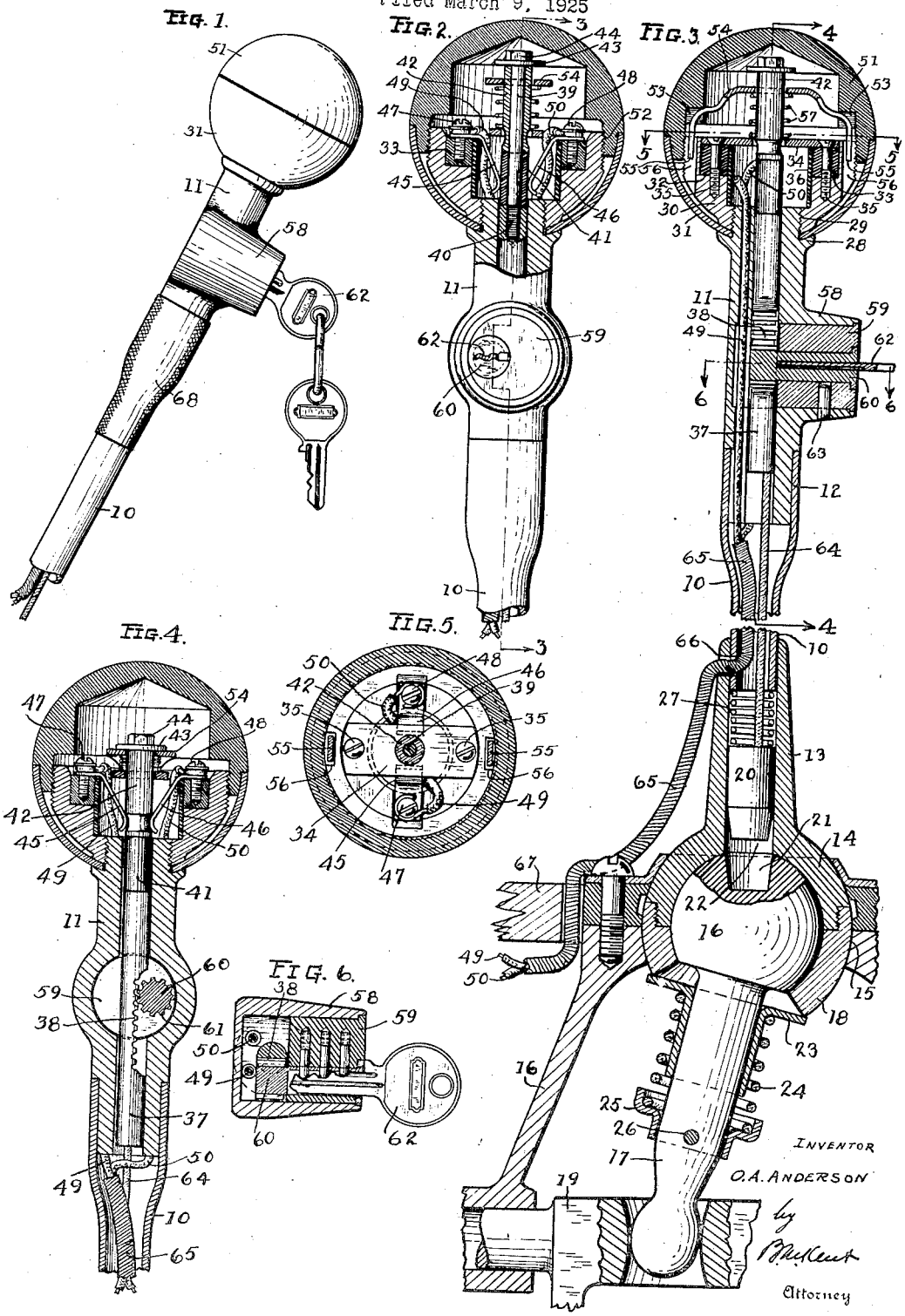

Patented Mar. 13, 1928.

1,662,099

UNITED STATES PATENT OFFICE.

OLAF A. ANDERSON, OF HAMILTON, OHIO.

LOCKING DEVICE FOR MOTOR VEHICLES.

Application filed March 9, 1925. Serial No. 14,130.

This invention relates to devices for locking the transmission gearing and the motor ignition circuit of a motor vehicle and has for one of its objects the provision of locking means whereby the transmission is automatically locked by the operation of a switch in the ignition circuit.

Transmission locks have been heretofore employed but experience has demonstrated the fact that these locks are ineffective because the operator of the vehicle neglects or forgets to use them. Practically all motor vehicles are provided with locked switches in the ignition circuit and experience has demonstrated the fact that the operator of a vehicle rarely ever neglects to stop the motor and lock the ignition circuit when he leaves the vehicle. It is therefore an object of this invention to take advantage of these facts and provide a single mechanism for controlling the ignition circuit and the transmission lock so that both will be locked by a single operation.

It is a further object of the invention to combine the ignition switch with the usual gear shift lever in such manner that a lock on the gear shift lever will, by a single locking operation, render the gear shift lever ineffective to shift the gears to a driving position and also actuate the switch to open the ignition circuit.

It is a further object of the invention to utilize the usual ball, that is located at the upper end of the gear shift lever, as a receptacle for the ignition switch and to provide a removable cap to conceal the switch, that will be locked against removal whenever the switch is open, and unlocked when the switch is closed, in order that access may be had to the switch.

Other objects of the invention and the features of novelty will be apparent from the following description taken in connection with the accompanying drawings, of which:

Figure 1 is a side elevation of a portion of a gear shift lever embodying my invention;

Fig. 2 is an enlarged elevation, at right angles to Fig. 1, with the upper end of the lever shown in section;

Fig. 3 is a longitudinal section on the line 3—3, of Fig. 2, a portion of the transmission mechanism and the lower end of the lever being also shown in section;

Fig. 4 is a section on the line 4—4 of Fig. 3;

Fig. 5 is a transverse section on the line 5—5 of Fig. 3; and

Fig. 6 is a transverse section on the line 6—6 of Fig. 3.

Referring to the drawings 10 indicates a tubular gear shift lever, preferably made of hardened steel and having an extension 11 at its upper end preferably made of forged steel and secured to the upper end of the part 10 by welding or brazing, as indicated at 12.

For the purpose of illustrating the principle of my invention I have shown the lower end of the part 10 as being secured in a member 13 which has a spherical enlargement 14, at its lower end, to fit in a bearing 15 in the transmission housing 16. The enlargement 14, of the member 13, is formed with a spherical socket to receive the ball 16 on the upper end of the lever section 17. A ring 18 is secured to the enlarged part 14 and serves to retain the ball 16 in its socket although permitting the ball to freely move in the socket relatively to the member 13, when the parts are not locked together, as will be presently described. The lower end of the lever section 17 engages with a pair of shifter forks, one of which is indicated at 19, these shifter forks having engagement with the transmission gears (not shown) and serving to shift these gears to their various positions, as is common in the motor vehicle art. I have not shown the transmission gearing because the present invention is not concerned with the particular type of gearing that may be employed and the arrangement of the member 13 and the lever section 17 merely illustrate one form in which my invention may be employed for the purpose of locking the transmission. In the form illustrated the lever section 17 is adapted to be locked to the member 13 by means of a plunger or bolt 20 which is adapted to enter the socket 21 in the ball 16. When the plunger 20 is lowered, from the position shown in Fig. 3, to engage with the socket 21, the lever section 17 will be rigidly connected with the member 13 so that the lever 10 will be operative to shift the gears of the transmission. When the plunger 20 is in the position shown in Fig. 3, the lever 10 may be moved to different positions without moving the lever section 17 and, hence without shifting the gears, the ball 16, under these conditions, simply moving in its socket and the lever 10 being rendered inoperative.

In the construction illustrated the socket 21 is normally maintained in alignment with the bore 22, in the member 13, by a collar 23 which is pressed agaist the ring 18 by means of the spring 24, the lower end of this spring engaging a collar 25 on the lever section 17, which is permanently secured to the section 17, by the pin 26.

A spring 27 is compressed between the upper end of the plunger 20 and the lower end of the tube 10 and serves to force the plunger downwardly into the socket 21 when the plunger is released, as will be hereinafter described.

The extension 11 is provided with a shoulder 28, near its upper end and, above this shoulder is threaded, as indicated at 29, to receive the member 30. A hemi-spherical shell 31 is clamped against the shoulder 28, by the member 30 and is also permanently secured to the shoulder 28 by being welded or brazed thereto. The member 30 is in the form of a ring having a shoulder 32 to receive the ring 33, of insulating material and on this ring 33 there is a bridge 34, also of insulating material, the ring 33 and the bridge 34 being secured in position by the screws 35. The member 30 is also lined with a short piece of tubing 36, of insulating material.

A rod 37 is slidably arranged in the member 11 and for a portion of its length is provided with rack teeth 38. A long bolt or screw 39 has threaded engagement with the upper end of the rod 37, as indicated at 40 and a piece of tubular insulating material 41 and a tubular contact member 42 are arranged on the bolt 39 and secured by means of the washer 43 and the head 44, the latter being part of the bolt 39. A pair of switch contacts 45 and 46 are secured to the ring 33 by the screws 47 and 48, respectively, these screws also serving as a means to secure the ignition circuit wires 49 and 50 to the contact members 45 and 46, respectively.

A hemi-spherical cap 51, of hardened steel, is provided with internal threads 52 to engage corresponding external threads on the member 30 for the purpose of securing the cap in position. The cap 51 is hollowed out and provided with notches 53 on opposite sides to receive the substantially U-shaped member 54 which is slidably arranged on the contact member 42. The prongs 55, of the member 54, enter the slots 56, in the opposite sides of the member 30 so that, when the member 54 is in the position shown in Fig. 3, it serves to prevent the cap 51 from being removed. A spring 57 is compressed between the under side of the member 54 and the top of the bridge member 34 and serves to raise the member 54 into the position shown in Fig. 3, when the rod 37 is raised to open the ignition circuit.

The member 11 is provided with an enlargement 58 to receive the lock mechanism 59 which is preferably of the pin type. The inner end of the cylinder 60, of this lock, is provided with gear teeth 61 which mesh with the rack teeth 38 so that by rotating the cylinder 60, by means of the usual key 62, the rod 37 may be raised or lowered. This is best shown in Figs. 3 and 4. The lock mechanism 59 may be secured in the enlargement 58 by means of a blind pin 63.

A suitable wire 64 is secured in the lower end of the rod 37 and to the plunger 20 and serves to withdraw the plunger 20 from the socket 21 when the rod 37 is raised by rotating the cylinder 60. The wires 49 and 50 extend downwardly through the member 11 and the tubular lever section 10 and are preferably provided with a suitable armor 65 to form a cable which may be brought out through the opening 66, in the gear shift lever and extend through the floor board 67 and thence connect to the ignition apparatus of the vehicle.

In the operation of the form of the invention illustrated, assuming that the parts are in the locked arrangement, as shown in Fig. 3, the key 62 is inserted in the cylinder 60 and rotated to move the rod 37 downward. This movement carries the contact member 42 to the position shown in Fig. 4 where it engages with the spring contacts 45 and 46 and thus closes the ignition circuit. At the same time the spring 27 forces the plunger 20 into the socket 21 and thus rigidly secures the lever section 17 to the member 13 so that the lever is then operable to shift the gears. In this way the mechanism is unlocked. The locking operation is performed by turning the key 62 in the reverse direction which raises the rod 37, separates the member 42 from the contacts 45 and 46, thus opening the ignition circuit, and also withdraws the plunger 20 from the socket 21 thereby rendering the lever inoperative to shift the gears. The key 62 may then be withdrawn and then lock the cylinder 60 and hold the rod 37 in its raised position, shown in Fig. 3. This will, of course, be done when the gears are in their neutral position. In the unlocking operation the member 54 is carried out of engagement with the notches 53 and therefore the cap 51 is unlocked and may be removed to give access to the switch mechanism. When the mechanism is locked the spring 57 lifts the member 54 to the locking position shown in Fig. 3.

From the foregoing it will be seen that I have provided a mechanism for locking and unlocking the ignition circuit and gear shift lever by a single key and by a single operation. It is realized that the locking of the ignition circuit may be circumvented by cutting the cable 65 and short circuiting the wires 49 and 50, at a point outside of the gear shift lever, but this does not unlock the vehicle as the transmission gearing will still remain in the locked condition and the theft of the vehicle will be prevented. However, the mechanism has the advantage of insuring that both the ignition circuit and the transmission gearing will be locked by the operation of opening the ignition circuit for the purpose of stopping the motor.

In order to avoid objectionable rattling of a bunch of keys, comprising the key 62, when the vehicle is in operation, I have provided a rubber sleeve 68 on the gear shift lever so that the keys will strike this sleeve when they swing.

Having thus described my invention, what I claim is:

1. In motor vehicles, the combination with the transmission gearing, the motor ignition circuit and a control switch therein, of a jointed control lever comprising a handle section and a section that is connected with said gearing and means for operatively connecting said sections together so that they act as a unitary lever, said switch being mounted on said lever, and movable means on said lever operatively connected with said switch and the first-mentioned means for actuating the same simultaneously.

2. In motor vehicles, the combination with the transmission gearing, the motor ignition circuit and a control switch therein, of a jointed control lever comprising a handle section and a section that is connected with said gearing and means for operatively connecting said sections together so that they act as a unitary lever, said handle section having a knob on its free end and said switch being housed in said knob, and movable means on said lever operatively connected with said switch and the first-mentioned means for actuating the same simultaneously.

3. In motor vehicles, the combination with the transmission gearing, the motor ignition circuit and a control switch therein, of a jointed control lever comprising a handle section and a section that is connected with said gearing and means for operatively connecting said sections together so that they act as a unitary lever, said switch being mounted on said lever, a member movably mounted in said handle section and operatively connected with said switch and the first mentioned means for actuating the same simultaneously, and a lock on said handle section having a rotatable element which actuates said member.

4. In motor vehicles, the combination with the transmission gearing, the motor ignition circuit and a control switch therein, of a jointed control lever comprising a handle section and a section that is connected with said gearing and means for operatively connecting said sections together so that they act as a unitary lever, said handle section having a knob on its free end and said switch being housed in said knob, a member movably mounted in said handle section and operatively connected with said switch and the first-mentioned means for actuating the same simultaneously, and a lock on said handle section having a rotatable element which actuates said member.

5. In motor vehicles, the combination with a control lever, and the motor ignition circuit, of a hollow knob on said lever, a switch in said circuit mounted in said knob, and lock-controlled means on said lever for actuating said switch.

6. In motor vehicles, the combination with the transmission gearing and its control lever, and the motor ignition circuit, of a hollow knob on said lever, a switch in said circuit mounted in said knob, lock-controlled means on said lever for actuating said switch, and means for rendering said lever inoperative also actuated by said switch-actuating means.

7. A transmission control lever for motor vehicles having a hollow knob comprising two parts one of which is rigidly attached to the lever and the other of which is removable, a switch mounted in said knob, a member movable within the lever to open and close said switch, and means actuated by said member for locking said removable part when said switch is open.

8. A transmission control lever for motor vehicles comprising a hollow handle having a hollow knob at its upper end, an ignition switch mounted in said knob, a plunger movable longitudinally of said handle and carrying the movable element of said switch for opening and closing the circuit, said plunger being provided with rack teeth, and a lock on said handle below said knob having a rotatable member provided with teeth engaging said rack teeth and whereby the plunger may be actuated to open and close said switch.

9. A transmission control lever for motor vehicles comprising a hollow handle having a hollow knob at its upper end, an ignition switch mounted in said knob, a plunger movable longitudinally of said handle and carrying the movable element of said switch for opening and closing the circuit, said plunger being provided with rack teeth, said knob having a removable part to permit access to said switch, a lock on said handle below said knob having a rotatable member provided with teeth engaging said rack and whereby the plunger may be actuated to open and close said switch, and means automatically controlled by said plunger for locking said part.

10. A transmission control lever for motor vehicles comprising a plurality of sections hinged together and means whereby said sections are connected for unitary movement, one of said sections being hollow and carrying a switch for controlling the ignition circuit of the vehicle motor, and a member slidable in said hollow section to open and close said switch and to actuate said means.

11. A transmission control lever for motor vehicles comprising a plurality of sections hinged together and means whereby said sections are connected for unitary movement, one of said sections being hollow and carrying a switch for controlling the ignition circuit of the vehicle motor, a member slidable in said hollow section to open and close said switch and to actuate said means, and a key-actuated lock having means for actuating said member.

In testimony whereof I affix my signature.

OLAF A. ANDERSON.